March 2, 1954 W. J. METZGER Re. 23,796

CAR COUPLER

Original Filed March 2, 1949 2 Sheets-Sheet 1

INVENTOR.
WILLIAM J. METZGER
BY Albert E. Field
ATTORNEY

March 2, 1954 W. J. METZGER Re. 23,796

CAR COUPLER

Original Filed March 2, 1949 2 Sheets-Sheet 2

INVENTOR.
WILLIAM J. METZGER
BY Albert E. Field
ATTORNEY

Reissued Mar. 2, 1954 Re. 23,796

UNITED STATES PATENT OFFICE 23,796

CAR COUPLER

William J. Metzger, East Cleveland, Ohio, assignor to National Malleable and Steel Castings Company, Cleveland, Ohio, a corporation of Ohio Original No. 2,617,540, dated November 11, 1952, Serial No. 79,140, March 2, 1949. Application for reissue December 15, 1953, Serial No. 398,457

2 Claims. (Cl. 213—155)

Matter enclosed in heavy brackets [ ] appears in the original patent but forms no part of this reissue specification; matter printed in italics indicates the additions made by reissue.

This invention relates to car couplers and more particularly to knuckle type couplers for railway cars.

In the present E coupler which is standard for use on railway cars the tail of the knuckle tends to tip the knuckle due to the fact that the preponderance of the weight thereof is in the tail portions. While the knuckle is provided on its underside with a pad which serves as a bearing on which the knuckle pivots about the pivot pin, the center of gravity of the knuckle is disposed beyond the extremities of the pad and on the tail side of the pivot pin, thereby causing the knuckle to tilt toward the tail side. This condition is aggravated by the additional weight of the coupler lock which rests on the knuckle tail when the knuckle is closed, and by associated lock operating parts. Furthermore, the wear on the bottom of the knuckle occurring as the result of service wear allows the knuckle to seat lower in the coupler head and thus further aggravates the interference.

This tilting of the knuckle is objectionable because the pulling lug on the underside of the knuckle tail is thereby caused to engage the floor of the coupler body and the frictional contact therebetween increases the force necessary to open the knuckle. The drag of the pulling lug against floor of the coupler as the knuckle is swung open requires the application of a considerably greater force to the handle of the uncoupling mechanism than would otherwise be necessary. In certain instances it is practically impossible to raise the uncoupling rod handle with sufficient force to open the knuckle.

Accordingly, it is the main object of my invention to provide a coupler knuckle in which its center of gravity is so disposed that there is no tendency for the knuckle to tilt with respect to its pivot pin.

More specifically my object is to provide a bearing pad on the underside of the knuckle so arranged that in conjunction with the coring of the knuckle tail there is no tendency for the knuckle to tip.

Figure 1:
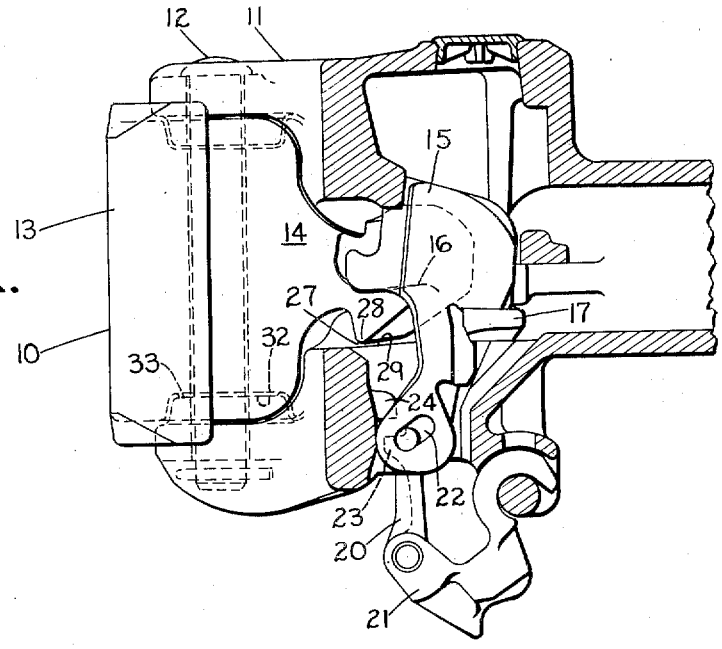

Other objects and advantages of my invention will be apparent from the following description taken in conjunction with the drawings in which:

Fig. 1, is a longitudinal vertical sectional view of an A. A. R. standard E coupler embodying my invention.

Figure 2:
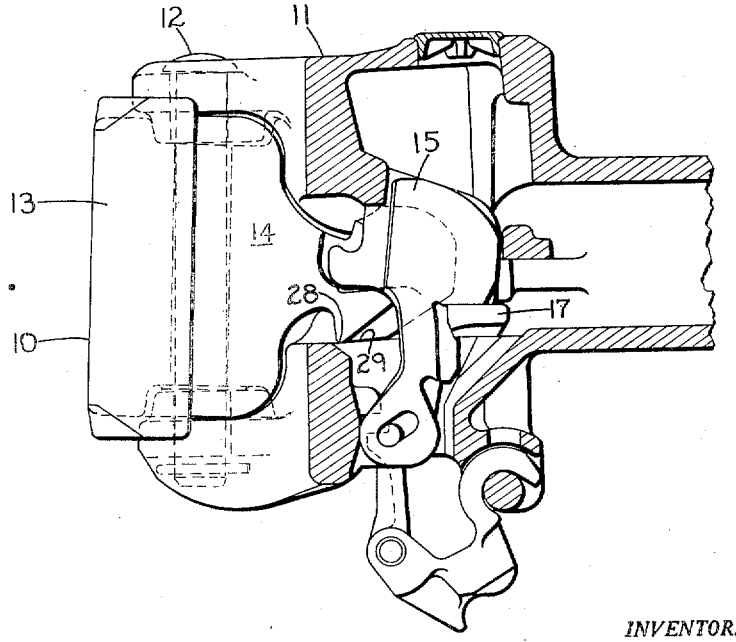

Fig. 2 corresponds to Fig. 1 but shows an A. A. R. standard E coupler.

Figure 3:
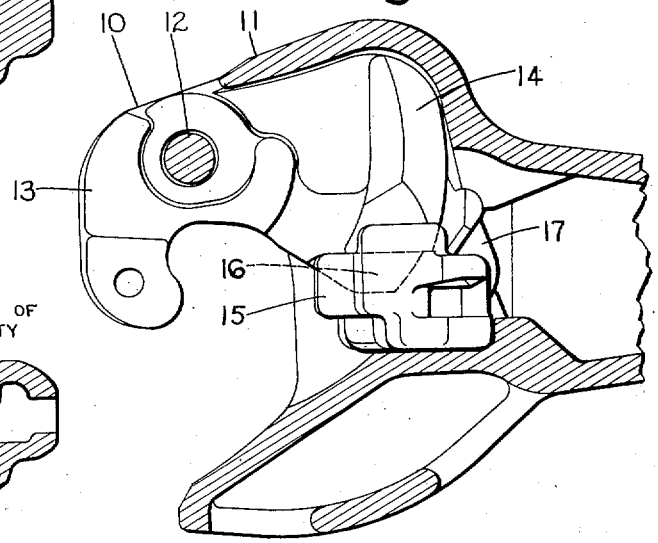

Fig. 3 is a horizontal sectional view of an A. A. R. standard E coupler.

Figure 4:
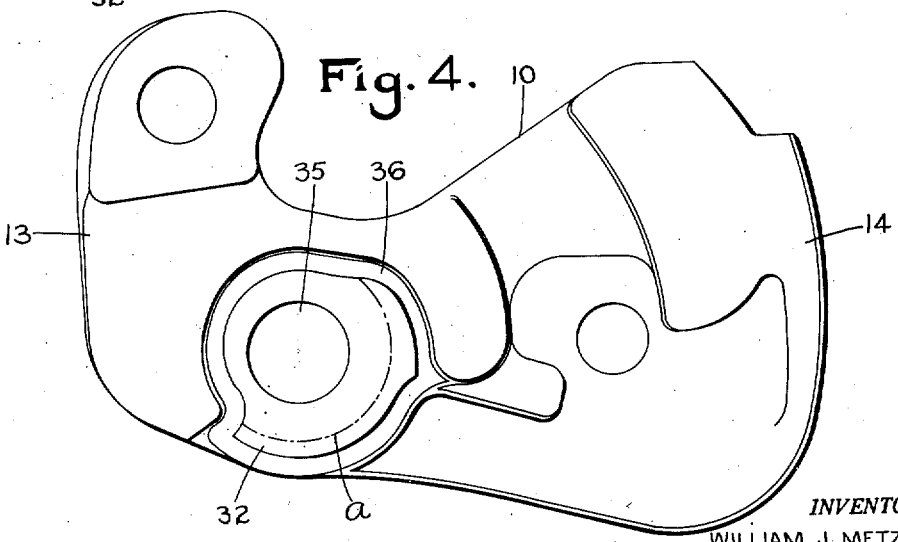

Fig. 4 is a bottom plan view of an A. A. R. standard E knuckle embodying my invention.

Figure 5:
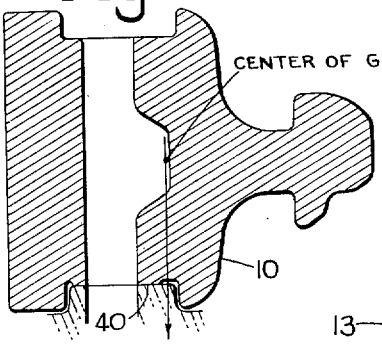

Fig. 5 is a vertical sectional view of a conventional A. A. R. E knuckle of the solid type.

Figure 6:
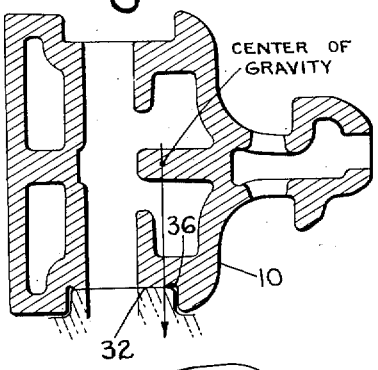

Fig. 6 is a vertical sectional view of an A. A. R. standard E knuckle cored, embodying my invention.

Referring to the drawings which illustrate an A. A. R. standard E coupler it will be seen that the knuckle 10 is pivoted to the coupler head 11 by means of a vertical pin 12. The knuckle comprises a forward nose portion 13 on one side of pin 12 and a tail portion 14 on the other side of the pin. With the knuckle in closed position as shown in Figs. 1, 2 and 3, the lock 15 is seated on the knuckle tail shelf 16 and on the knuckle thrower 17. The lock is also interposed between the knuckle tail and the side wall of the coupler head to maintain the knuckle in locked position.

To open the knuckle the lock must first be raised until it is clear of the knuckle tail. This is accomplished by the actuation of toggle 20 and rotor lever 21 by means of the usual uncoupling rod (not shown) connected to the lever. As the rotor lever is actuated the upper end of toggle 20 moves upwards and rearward in the inclined slot 22, and withdraws anticreep lug 23 from beneath stop 24 in the coupler head, thereby permitting the lock to be raised to unlocked position.

In Fig. 1 is shown an A. A. R. standard E coupler which has a knuckle 10 embodying my invention, the knuckle being in closed position. It will be observed in particular that the knuckle is in upright position with a clearance as at 27 between pulling lug 28 and the floor 29 of the coupler. The only contact between the knuckle and the coupler head is that which occurs between pad 32, the novelty of which will appear in a succeeding part of this specification, and seat 33 on the coupler head.

Fig. 2 is similar to Fig. 1 but shows the present A. A. R. standard E coupler with a conventional knuckle and illustrates the tilted position of the knuckle. It will be observed that knuckle 10 is tilted rearwardly and that pulling lug 28 is in contact with floor 29 of the coupler head. Therefore, lug 28 will drag along the floor of the coupler as the knuckle is pivoted about its pivot pin and this will increase considerably the force which is required to swing the knuckle from locked to open position.

I have found that in extending pad 32 toward the knuckle tail the pad will underlie the center of gravity of the knuckle and will therefore prevent tilting thereof. In Fig. 4 which shows the underside of an A. A. R. standard E coupler knuckle, the outline of pad 32 is illustrated. The pad is formed eccentrically around the knuckle pin hole, the greater part of its area being to the knuckle tail side of the pivot pin hole 35.

Adjacent the side of the pad the knuckle is recessed as at 36 in order to assure a flat bearing surface on the pad. The curved dot-dash line a represents the contour of the pad as it exists in the present E coupler knuckle. It will be seen that the area of the support pad has been substantially increased, most of the addition being to the rear or tail side of the pin hole.

In Fig. 5 is shown the position of the center of gravity of the existing solid type E coupler knuckle with respect to the pad 40. It will be observed that the center of gravity is outside the boundary of the pad and therefore will cause the knuckle to tilt in the direction of its tail.

In 1946 the A. A. R. specifications were changed to permit the coring of the solid type knuckle in order to decrease the weight of the knuckle. To maintain the required strength of the cored knuckle it is made from high tensile steel. This coring of the knuckle is shown in Fig. 6. While the coring effected a reduction in weight of the knuckle tail in respect to the forward portion 13 the knuckle still tended to tilt toward its tail side and render difficult the opening of the knuckle.

Fig. 6 corresponds to Fig. 5 but shows an A. A. R. standard E knuckle cored and having my improved pad 32 applied thereto. This view shows that the center of gravity of the knuckle when projected downward lies within the extremity of the pad, thereby avoiding any tendency of the knuckle to tilt. Furthermore, it has been demonstrated that even with the weight of the coupler lock and toggle resting on the knuckle tail the knuckle remains upright.

It will be seen therefore, that the extension of the knuckle bearing pad toward the knuckle tail, assisted by the coring of the knuckle, serves to dispose the center of gravity of the knuckle so that it lies within the extremity of the pad, and thus precludes tilting of the knuckle. My improvement thereby eliminates any drag between the lower pulling lug of the knuckle and the floor of the coupler head.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A car coupler knuckle comprising a forward nose portion and a rearward tail portion, *said tail portion forming a support for a lock and operating means therefor*, said knuckle having a vertical pivot pin hole intermediate said portions for receiving a pin for connecting said knuckle to a coupler head, the combined center of gravity of said nose and tail portions *and of the associated lock and lock operating means* being located rearwardly of said pivot pin hole, said knuckle having a continuous pad on its underside surrounding said pivot pin hole, said pad comprising a flat undersurface coextensive therewith and extending rearwardly toward said tail portion so as to underlie said center of gravity, said pad and said undersurface serving to support said knuckle in upright position.

2. In a car coupler having a head, a knuckle pivoted to said head about a vertical pin, a *knuckle thrower*, said knuckle having a tail portion disposed rearwardly of said pin, *a lock for said knuckle seated on said tail and thrower, lock operating means connected to said lock and supported thereby*, said head having a flat horizontally disposed seat about said pin beneath said knuckle, said knuckle having on its underside a continuous pad surrounding the knuckle pin opening therein for engagement with said seat for supporting said knuckle, the *combined* center of gravity of said knuckle *and of the lock and operating means supported by said knuckle* being located on the tail side of said pin, said pad comprising a flat undersurface coextensive therewith lying in a single plane, said undersurface extending rearwardly [so as to underlie] *beyond* said center of gravity, said pad and said undersurface serving to support said knuckle in upright position on said seat *even with said lock and operating means supported by said tail.*

WILLIAM J. METZGER.

References Cited in the file of this patent or the original patent

UNITED STATES PATENTS

| Number | Name | Date |
|---|---|---|
| 440,586 | Eastwick | Nov. 11, 1890 |
| 1,144,316 | Bazeley | June 22, 1915 |
| 1,203,319 | Durbin | Oct. 31, 1916 |
| 1,696,040 | Kelso | Dec. 18, 1928 |
| 1,932,440 | Bazeley | Oct. 31, 1933 |
| 2,088,135 | Johnson et al. | July 27, 1937 |
| 2,091,446 | Joiner | Aug. 31, 1937 |
| 2,596,153 | Kayler | May 13, 1952 |